United States Patent
Bratanov

(10) Patent No.: US 9,459,984 B2
(45) Date of Patent: Oct. 4, 2016

(54) METHOD AND SYSTEMS FOR EXTERNAL PERFORMANCE MONITORING FOR VIRTUALIZED ENVIRONMENTS

(75) Inventor: Stanislav Viktorovich Bratanov, Nizhniy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 12/739,339

(22) PCT Filed: Oct. 29, 2007

(86) PCT No.: PCT/RU2007/000599
§ 371 (c)(1),
(2), (4) Date: Apr. 22, 2010

(87) PCT Pub. No.: WO2009/058042
PCT Pub. Date: May 7, 2009

(65) Prior Publication Data
US 2010/0235836 A1    Sep. 16, 2010

(51) Int. Cl.
G06F 9/455 (2006.01)
G06F 11/34 (2006.01)

(52) U.S. Cl.
CPC ....... G06F 11/3466 (2013.01); G06F 9/45533 (2013.01)

(58) Field of Classification Search
CPC .................. G06F 9/45533; G06F 11/3466
See application file for complete search history.

(56) References Cited

U.S. PATENT DOCUMENTS 5,621,912 A * 4/1997 Borruso et al. .................... 718/1
6,415,243 B1 * 7/2002 Mann ............................. 702/181

(Continued)

FOREIGN PATENT DOCUMENTS

| WO | 2007/068602 A2 | 6/2007 |
| WO | 2009/058042 A1 | 5/2009 |

OTHER PUBLICATIONS

Harkema M. et al., Performance Monitoring of Java Applications ACM< WOSP'02, Jul. 24-26, 2002.*

(Continued)

Primary Examiner — Scott L Jarrett
(74) Attorney, Agent, or Firm — Grossman, Tucker, Perreault & Pfleger, PLLC

(57) ABSTRACT

Embodiments of the present invention provide for performance monitoring of virtualized environments by establishing external performance monitoring (in a primary domain) of a virtual machine manager in whose context a virtual machine operates, and simultaneously capturing information on the virtual machine execution states. In accordance with an embodiment of the present invention, the execution states may comprise any combination of a virtualized processor index, execution address, program (task) identifier, and a timestamp. In one embodiment, a primary domain performance monitoring component may initiate time- or event-based profiling of the virtual machine, and a hypervisor may report the virtualized execution states to the performance monitoring component upon reception of each profiling interrupt. Alternatively, the time-based profiling may be initiated in the virtual machine domain. In this case, the hypervisor or virtual machine manager may enable access from within the virtual machine to performance characteristics collected in the primary domain, or communicate the execution states to the external monitoring component upon reception of each profiling interrupt or upon a change in the virtualized execution states. Performance information collected in the primary domain may then be correlated with the execution states of the virtual machine.

8 Claims, 5 Drawing Sheets

(56) References Cited

U.S. PATENT DOCUMENTS

| | | | |
|---|---|---|---|
| 6,457,142 B1* | 9/2002 | Klemm et al. | 714/38.12 |
| 6,499,116 B1* | 12/2002 | Roth et al. | 714/39 |
| 7,062,684 B2* | 6/2006 | DeWitt et al. | 714/45 |
| 7,191,440 B2* | 3/2007 | Cota-Robles et al. | 718/1 |
| 7,219,241 B2* | 5/2007 | Cooper et al. | 713/310 |
| 7,225,309 B2* | 5/2007 | DeWitt et al. | 711/165 |
| 7,318,141 B2* | 1/2008 | Bennett et al. | 711/202 |
| 7,421,592 B1* | 9/2008 | Kadatch et al. | 713/300 |
| 7,627,857 B2* | 12/2009 | Rokosz | 717/124 |
| 7,827,541 B2* | 11/2010 | Chen et al. | 717/130 |
| 7,865,703 B2* | 1/2011 | Chen et al. | 712/227 |
| 8,171,340 B2* | 5/2012 | Molnar et al. | 714/26 |
| 8,209,668 B2* | 6/2012 | Bartik et al. | 717/127 |
| 2003/0037089 A1* | 2/2003 | Cota-Robles et al. | 709/1 |
| 2004/0107369 A1* | 6/2004 | Cooper et al. | 713/300 |
| 2004/0267691 A1* | 12/2004 | Vasudeva | 707/1 |
| 2005/0240828 A1 | 10/2005 | Rothman et al. | |
| 2006/0161917 A1* | 7/2006 | Leung et al. | 718/100 |
| 2006/0248410 A1* | 11/2006 | Circello et al. | 714/47 |
| 2007/0043860 A1* | 2/2007 | Pabari | 709/224 |
| 2007/0143753 A1* | 6/2007 | Vasile | 718/1 |
| 2007/0168976 A1 | 7/2007 | Klein | |
| 2007/0168996 A1 | 7/2007 | Klein | |
| 2007/0220495 A1* | 9/2007 | Chen et al. | 717/130 |
| 2008/0065702 A1* | 3/2008 | Dickerson et al. | 707/202 |
| 2008/0196043 A1* | 8/2008 | Feinleib et al. | 719/319 |
| 2008/0222632 A1* | 9/2008 | Ueno et al. | 718/1 |
| 2008/0235700 A1* | 9/2008 | Iguchi | 718/104 |
| 2008/0288940 A1* | 11/2008 | Adams et al. | 718/1 |
| 2008/0301473 A1* | 12/2008 | Perez et al. | 713/300 |
| 2009/0083735 A1* | 3/2009 | Kimura | 718/1 |
| 2009/0113156 A1* | 4/2009 | Fujita et al. | 711/165 |
| 2010/0268816 A1* | 10/2010 | Tarui et al. | 709/224 |
| 2010/0274890 A1* | 10/2010 | Patel et al. | 709/224 |

OTHER PUBLICATIONS

Hauswirth, Matthias, Understanding Program Performance Using Temporal Vertical Profiles University of Colorado, Apr. 2005.*

Menon, Aravind et al., Diagnosing Performance Overheads in the Xen Virtual Machine Environment ACM, VEE'05, Jun. 11-12, 2005.*

Sweeney, Peter F. et al., Using Hardware Peformance Monitors to Understand the Behavior of Java Applications IBM, 2004.*

Gupta, Diwaker et al., XenMon: QoS Mointoring and Performance Profiling Tool HP Laboratories, Oct. 18, 2005.*

Hauswirth, Matthias et al., Vertical Profiling: Understanding the Behavior of Object Oriented Applications ACM, OOPSLA'04, Oct. 24-28, 2004.*

Barton, John J. et al., A Real-Time Performance Visualizer for Java Dr. Dobb's Journal, Mar. 1998.*

Du, Jiaqing et al., Performance Profiling in a Virtualized Environment, Proceeding HotCloud'10 Proceedings of the 2nd USENIX conference on Hot topics in cloud computing, 2010.*

Santos, J. Renato et al., Profiling in Xen HP Labs Xen Summit, Sep. 7-8, 2006.*

Sprunt, Brinkley, The Basics of Performance Monitoring Hardware IEEE, 2002.*

Robin, John Scott et al., Analysis of Intel Pentium's Ability to Support a Secure Virtual Machine Monitor Proceeding SSYM'00 Proceedings of the 9th conference on USENIX Security Symposium—vol. 9, 2000.*

Bui, Van, PerfOMP: A Runtime Performance/Event Monitoring Interface for OPENMP University of Houston, May 2007.*

Intel—Debugging and Performance Monitoring, Date Unknown.*

Menon, Aravind et al., Diagnosing Performance Overheads in the Xen Virtual Machine Environment ACM, May 3, 2005.*

International Search Report and Written Opinion received for PCT Patent Application No. PCT/RU2007/000599, mailed on Sep. 8, 2008, 11 pages.

International Preliminary Report on Patentability received for PCT Patent Application No. PCT/RU2007/000599, May 4, 2010, 5 pages.

Menon et al., "Diagnosing Performance Overheads In the xen Virtual Machine Environment", Proceedings of the First ACM/USENIX International Conference on Virtual Execution Environments, Jun. 11-12, 2005, 12 pages.

The Xen Team, "Xen interface manual (Xen v2.0)", Mar. 11, 2004, 14 pages, available at:. <http://web.archive.org/web/20041011095249/www.cl.cam.ac.uk/Research/SRG/netos/xen/readmes/interface/interface.html>.

Huai et al., "CIVIC: a Hypervisor based Virtual Computing Environment", International Conference on Parallel Processing Workshops, 2007, ICPPW 2007, Sep. 10-14, 2007, pp. 51-51.

Alexander et al., "A Unifying Approach to Performance Analysis in the Java Environment", IBM Systems Journal, vol. 39, No. 1, 2000, pp. 118-134.

Whitaker et al., "Rethinking the Design of Virtual Machine Monitors", Computer, IEEE Service Center, vol. 38, No. 5, May 2005, pp. 57-62.

Memorandum Opinion; *Network Congestion Solutions, LLC* v. *United States Cellular Corporation*, Civ. No. 14-903-SLR; *Network Congestion Solutions, LLC* v. *Widepoenwest Finance, LLC*, Civ. No. 14-904-SR; In the United States District Court, for the District of Delaware; Mar. 22, 2016; 19 pages.

Memorandum Opinion; *SRI International, Inc.* v. *Cisco Systems, Inc.*, Civ. No. 13-1534-SLR; In the United States District Court, for the District of Delaware; Apr. 11, 2016, 43 pages.

\* cited by examiner

METHOD AND SYSTEMS FOR EXTERNAL PERFORMANCE MONITORING FOR VIRTUALIZED ENVIRONMENTS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

Embodiments of the present invention relate generally to performance monitoring of virtualized systems and, more specifically, to efficient methods of associating performance information collected by an external instrument in a primary domain with execution states of virtual domains.

2. Description

Modern performance monitoring methods enable fine granularity measurements of various operational aspects of processor functional units. Highly sophisticated processor performance monitoring units (PMUs) and specialized performance monitoring tools provide necessary assistance to a programmer in locating performance inefficiencies, determining their root causes, and finding the best solution to improve program performance.

Unfortunately, the majority of the aforementioned performance monitoring instruments and techniques are not available in virtualized environments as the actual software activity within a virtual machine is visible only to a virtual machine manager and is completely transparent to other programs operating on a physical machine (primary domain programs). Thus, traditional means of performance monitoring become insufficient to associate processor (as well as any other hardware) performance characteristics collected in the primary domain with the execution states (e.g., instruction addresses and task contexts) of programs running inside the virtual machine.

A natural step to employ the power of modern processor capabilities in the analysis of virtualized system performance might be complete virtualization of PMU hardware, enabling operation of the traditional performance monitoring tools inside the virtual machine as if executed by a physical processor. However, this approach may in some cases be inefficient with regard to both performance and design complexity of a virtualization engine. Thus, the absence of industry standards for performance monitoring units determines the existence of a great variety of PMU designs, and, in its turn, complicates the virtualization. Besides, in many cases, performance measurements have to be performed by real PMUs, as some parts of virtualized code may be directly executed by the physical processor in order to accelerate the virtualization. It may constitute a problem when trying to simulate a processor whose performance monitoring capabilities differ from those of the physical system. Moreover, in pure-software virtualization engines (as well as in some hardware-assisted ones) the virtual machine manager responsible for the actual simulation is implemented as a process operating in the context of the primary domain operating system, hence the necessity to control task scheduling of the primary operating system in order to exclude unrelated performance data, as the PMU may otherwise continue operation while other primary domain programs or virtual machines are active.

Therefore, a need exists for the capability to assign processor performance characteristics to the actual software activity points within a virtual machine with the highest possible accuracy, while minimizing the collection intrusiveness level and keeping the complexity of the virtualization engine within acceptable limits.

BRIEF DESCRIPTION OF THE DRAWINGS

The features and advantages of the present invention will become apparent from the following detailed description of the present invention in which.

DETAILED DESCRIPTION

An embodiment of the present invention is a method that provides for efficient association of performance characteristics collected in the context of a primary domain operating system with the actual execution states of programs executing inside a virtual machine, thus enabling the use of physical performance monitoring capabilities for measuring program performance in virtualized environments.

Reference in the specification to "one embodiment" or "an embodiment" of the present invention means that a particular feature, structure or characteristic is included in at least one embodiment of the present invention. Thus, the appearances of the phrase "in one embodiment" appearing in various places throughout the specification are not necessarily all referring to the same embodiment.

The following definitions may be useful for understanding embodiments of the present invention described herein.

A Virtual Machine (VM) is a simulated hardware system that runs an independent operating system and application programs. A VM may be referred to as Guest, Virtual Domain or Virtualized Environment.

A Primary Domain comprises an operating system and application programs operating on a physical hardware system. The Primary Domain may be referred to as Host. The Primary Domain for purposes of the present specification may also comprise the virtual machine that services requests from other virtual machines.

A Hypervisor is a software module isolating hardware resources from both the host and virtual systems. The resource isolation may be based on hardware capabilities of modern processors (hardware-assisted virtualization) or implemented by software means, in which case the hypervisor is included in the primary domain.

A Virtual Machine Manager (VMM) is a program that performs the emulation of a virtual machine.

A Performance Monitoring Unit (PMU) is processor logic responsible for measuring processor operational characteristics. PMU interfaces with system software by means of performance counters.

A Performance Event is a measurable change in processor operational characteristics (e.g., processor clock tick or bus access).

A Performance Monitoring Interrupt (PMI) is an interruption signal generated by the processor when any one of the enabled performance event counters overflows.

Time-Based Sampling (TBS) is the process of determining a software execution state (e.g., code address being executed) by means of interrupting the normal execution flow after certain time intervals.

Event-Based Sampling (EBS) is the process of determining the software execution state (e.g., code address being executed) by means of interrupting the normal execution flow after collecting a certain amount of processor events.

Figure 1:
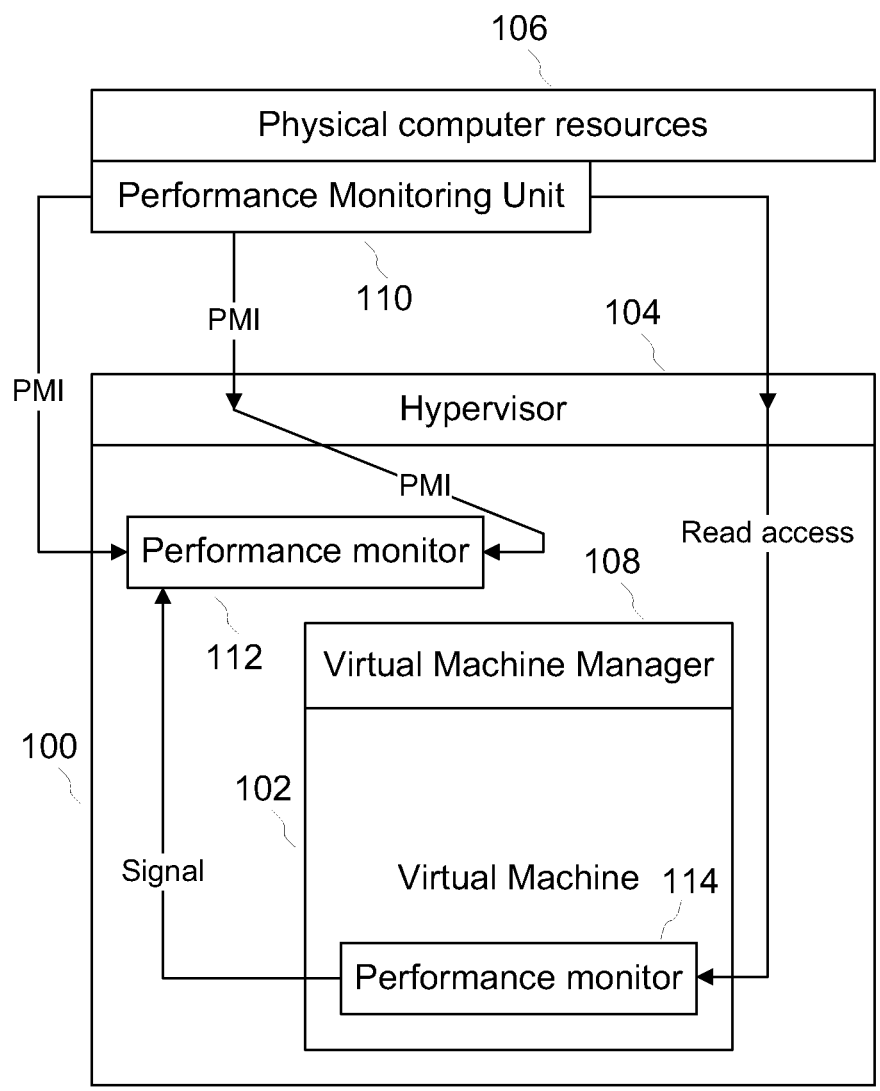
FIG. 1 is a diagram illustrating an exemplary virtualization system to which embodiments of the present invention may apply, and performance information and control flow paths according to an embodiment of the present invention.

FIG. 1 is a diagram illustrating an exemplary virtualization system to which embodiments of the present invention may apply, and performance information and control flow paths according to an embodiment of the present invention. According to the figure, a system embodying the present invention may comprise primary domain 100 operating on a physical computer, virtual machine 102, and hypervisor 104 abstracting physical computer resources 106 for both primary and virtual domains. Virtual machine manager 108 may execute within the primary domain, perform virtualization of the code operating inside virtual machine 102, and provide an interface to said virtual machine for primary domain users. To employ capabilities of performance monitoring unit 110, performance monitoring component 112 may execute in primary domain 100.

In one embodiment of the present invention primary domain performance monitoring component 112 may program performance monitoring unit 110 to collect performance events and generate a performance monitoring interruption after collecting a certain number of the events. Hypervisor 104 may then accept said interruption, check if the interruption was generated during an activity period of virtual machine 102, capture a current execution state of the virtual machine, and report said state to primary domain performance monitoring component 112 synchronously with the invocation of the component's PMI service routine, thus providing for associating the reported state with the sampled number of performance events.

In case a particular virtualization engine does not implement a hypervisor or the hypervisor does not handle performance monitoring interrupts, virtual domain performance monitoring component 114 may collect information on virtual machine execution states over time. Then, performance events collected in the primary domain may be associated with execution states of the virtual domain using time references as will be described further in this specification.

Other embodiments of the present invention may rely on the hypervisor's capability to provide access to physical PMU resources from inside the virtual domain, as well as on a synchronous communication channel between the primary and virtual domains. Thus, virtual machine performance monitor 114 may initiate time-based performance monitoring inside virtual machine 102 by traditional means provided by modern operating systems. At the same time, primary performance monitor 112 may program the physical PMU to count performance events. The virtual machine performance monitoring component may then either read the contents of the hardware PMU registers upon any time-based performance interruption, or report the current virtual machine execution state to the primary performance monitor by signaling via the aforementioned communication channel. The performance events may then be associated with the virtual machine execution states, since the preservation of performance register contents is performed synchronously with collecting the execution states, so that the current state remains unchanged while reading the registers (or signaling to the primary domain component).

Figure 2:
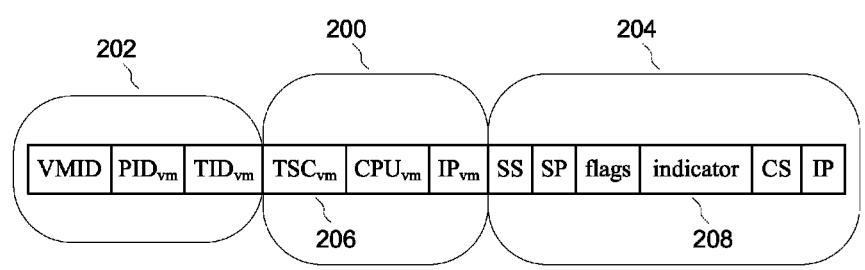
FIG. 2 is a diagram illustrating virtualized system and architectural states and an exemplary encoding of a performance interrupt stack frame according to an embodiment of the present invention.

FIG. 2 is a diagram illustrating virtualized system and architectural states and an exemplary encoding of a performance interrupt stack frame according to an embodiment of the present invention. According to the figure, virtualized states 200 and 202 may be reported by the hypervisor to the primary domain performance monitor via a modified performance interrupt stack frame. The modified stack frame in the example of the figure may comprise processor stack frame 204 formed of instruction pointer (IP), stack segment selector (CS), flags register, stack pointer (SP), and stack segment selector (SS) as specified in publicly available Intel Architecture documentation. An invalid (with regard to the processor specification) value of any of those fields may serve as an indicator that the entire stack frame was not originally generated by a physical processor. One embodiment of the present invention may employ high-order bits of the code segment selector (known to be always cleared by the processor) as indicator field 208. Non-zero values of the field may indicate the presence of any combination of architectural 200 and system 202 virtual domain states at higher addresses of the stack frame.

System state 202 may comprise information sufficient to identify a software task operating inside the virtualized environment—typically, process ($PID_{vm}$) and thread ($TID_{vm}$) identifiers reported by the operating system. In case multiple virtual machines are active within the same primary domain, the system state may also include a virtual machine identifier (VMID).

Architectural state 200 may contain information on at least a virtualized processor ($CPU_{vm}$) and current virtualized instruction pointer ($IP_{vm}$). Providing time reference ($TSC_{vm}$) may be required for establishing further correspondence between the system and architectural states in case said states are not reported synchronously or the primary and virtual domains do not operate on the same timescale.

Persons skilled in the art will recognize the option of extending the reported virtual domain states, without leaving the scope of the present invention, by adding extra fields and characteristics as may be necessary for a particular task of performance monitoring, said fields and characteristics to be associated with performance information.

The above described scheme of communicating VM states via stack frames may be especially useful for hypervisor-based virtualization engines, since it is the hypervisor's responsibility to handle all system interrupts in order to abstract hardware resources for both primary and virtual domains. Thus, invoking the primary domain performance interrupt routine may be naturally aligned with the hypervisor's functionality and, at the same time, may constitute a synchronous means of communication (as the notification is passed to the primary domain performance monitor along the performance monitoring interrupt control path, so the interrupted VM state remains unchanged until the control leaves the PMI handler). One skilled in the art will also recognize the option of implementing other means of synchronous communication of VM states to the primary domain performance monitoring component, while remaining within the scope of the present invention, —e.g., by maintaining a shared memory location readable from the host domain and being periodically updated with the system and architectural states of the virtual domain.

Figure 3:
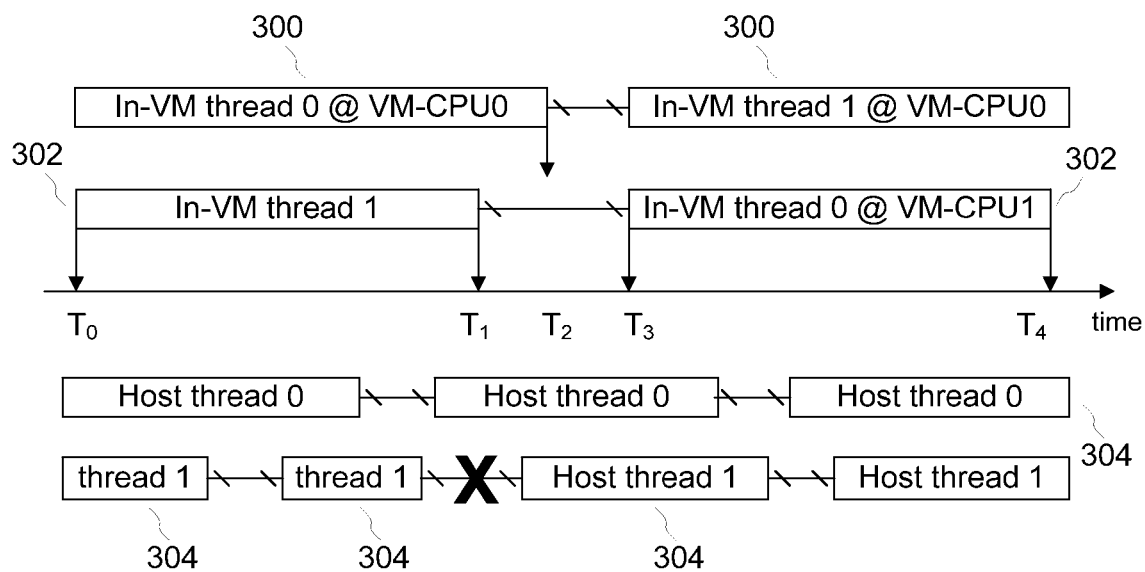
FIG. 3 is a diagram illustrating the process of establishing correspondence between virtualizing threads and virtualized processors according to an embodiment of the present invention.

FIG. 3 is a diagram illustrating the process of establishing correspondence between virtualizing threads and virtualized processors according to an embodiment of the present invention. It should be noted here that if both architectural and system states of the virtual domain are reported to the primary domain performance monitoring component in a manner synchronized with the delivery of a performance monitoring interruption, the correlation between the measured number of performance events and the virtual machine execution states may be established automatically. Otherwise, if only a partial execution state (architectural state) is reported, the following procedure may be required for associating performance events with the execution states.

According to the figure, primary domain execution threads 304 operate on a uniform timescale with virtual domain execution threads 300 and 302. While for some virtualization engines the primary and virtual domain timescales may not coincide, the timestamp references reported from the virtual domain as part of the architectural state may be employed to align the timescales by associating the reported timestamps with those measured at the primary domain upon reception of a performance monitoring interrupt. The aforementioned association may not incur the loss of precision as the virtualized architectural state is reported synchronously with the primary domain interruption, meaning that there may be no change to both primary and virtualized execution states. Thus, the primary and virtualized timestamps may be viewed as referring to exactly the same logical execution point in time.

The above assumption may enable further association of performance events measured for each primary domain thread 304 with the system states of virtual domain threads 300 and 302 by selecting a virtualized thread that may be active on a reported virtualized processor at a given point on the uniform timescale.

Moreover, one skilled in the art will recognize that embodiments of the present invention provide for association of performance events with virtualized states even in cases of performance monitoring-agnostic virtualization engines. For that purpose, the correspondence needs to be established between primary domain virtualization threads and virtual domain processors. One embodiment of the present invention may retrieve primary domain processor identifiers while executing on each of the virtualized processors and assigning current timestamps of the uniform timescale to the identifiers retrieved. The resulting information may enable direct association of virtualized processors and primary domain execution threads that may be active at a given timestamp. Refer to Appendix B for an exemplary implementation of the processor association code.

Another embodiment of the present invention may form a system of linear equations describing the simultaneous activity of primary and virtual domain threads over the uniform timescale. In the example of FIG. 3, virtual thread 300 may be active on virtual processor 0 and virtual thread 302 may be active on virtual processor 1 at times $T_0$, $T_1$, $T_2$, $T_3$, and $T_4$. By checking the activity of primary domain threads at the given points in time one may unambiguously determine that virtual thread 0 was active simultaneously with primary thread 0 at time $T_1$; that yields the correspondence between virtual processor 0 and primary thread 0.

Other embodiments of the present invention may employ other means of establishing correspondence between virtualizing threads and virtualized processors, as well as other means of time synchronization to form a uniform timescale for the primary and virtual domains.

Figure 4:
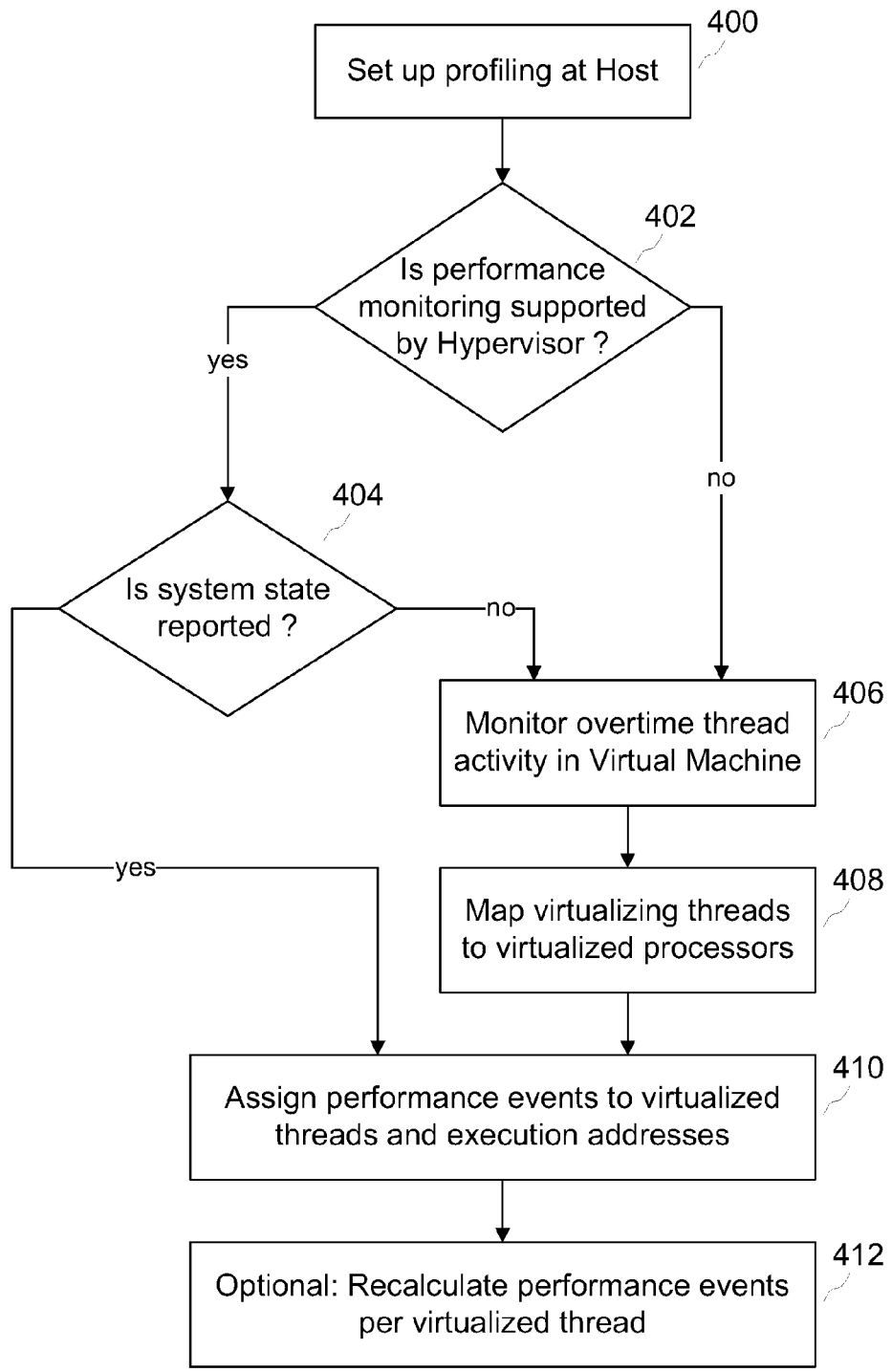
FIG. 4 is a flow diagram illustrating the process of host-driven performance monitoring of a virtual machine in accordance with an embodiment of the present invention.

FIG. 4 is a flow diagram illustrating the process of host-driven performance monitoring of a virtual machine in accordance with an embodiment of the present invention. According to the figure, performance profiling may be initiated in the primary domain at block 400. In case performance monitoring is not supported by the virtualization engine (as may be checked at block 402), the overtime monitoring of system activity for the virtual domain may be started at block 406. Monitoring of system activity may comprise tracking the change in current processor and software task identifiers over time. Correspondence between the primary domain execution threads and the processors they virtualize may be established at block 408 as described above for the example of FIG. 3. Then, after the correspondence may have been established, the system and architectural states of the virtual domain may be associated with the primary domain performance events at block 410. Finally, the distribution of performance events may be corrected at block 412 by recalculating said invents on a per-virtual task basis, in a zero-based, gradually increasing manner as illustrated in Appendix D.

In case the virtualization engine provides support for performance monitoring, the level of that support may be checked at block 404. If complete system and architectural states are reported by the hypervisor to the primary domain performance monitoring component, the control may be transferred to block 410 to associate the reported system states with the performance events accrued for the corresponding primary domain thread. Otherwise, if only the architectural state is reported, the operation may proceed with monitoring virtual machine activity over time at block 406 in a manner similar to what was described above. The difference between these two cases of no support and partial state reporting from the virtual domain is in higher precision of associating performance events with the actual state of virtual machine execution in the latter case.

One skilled in the art will recognize that the disclosed method provides for employing such modern software profiling and analysis technique as event-based sampling, and enables the use of said technique inside virtualized environments without the need for the actual virtualization of physical performance monitoring resources.

Figure 5:
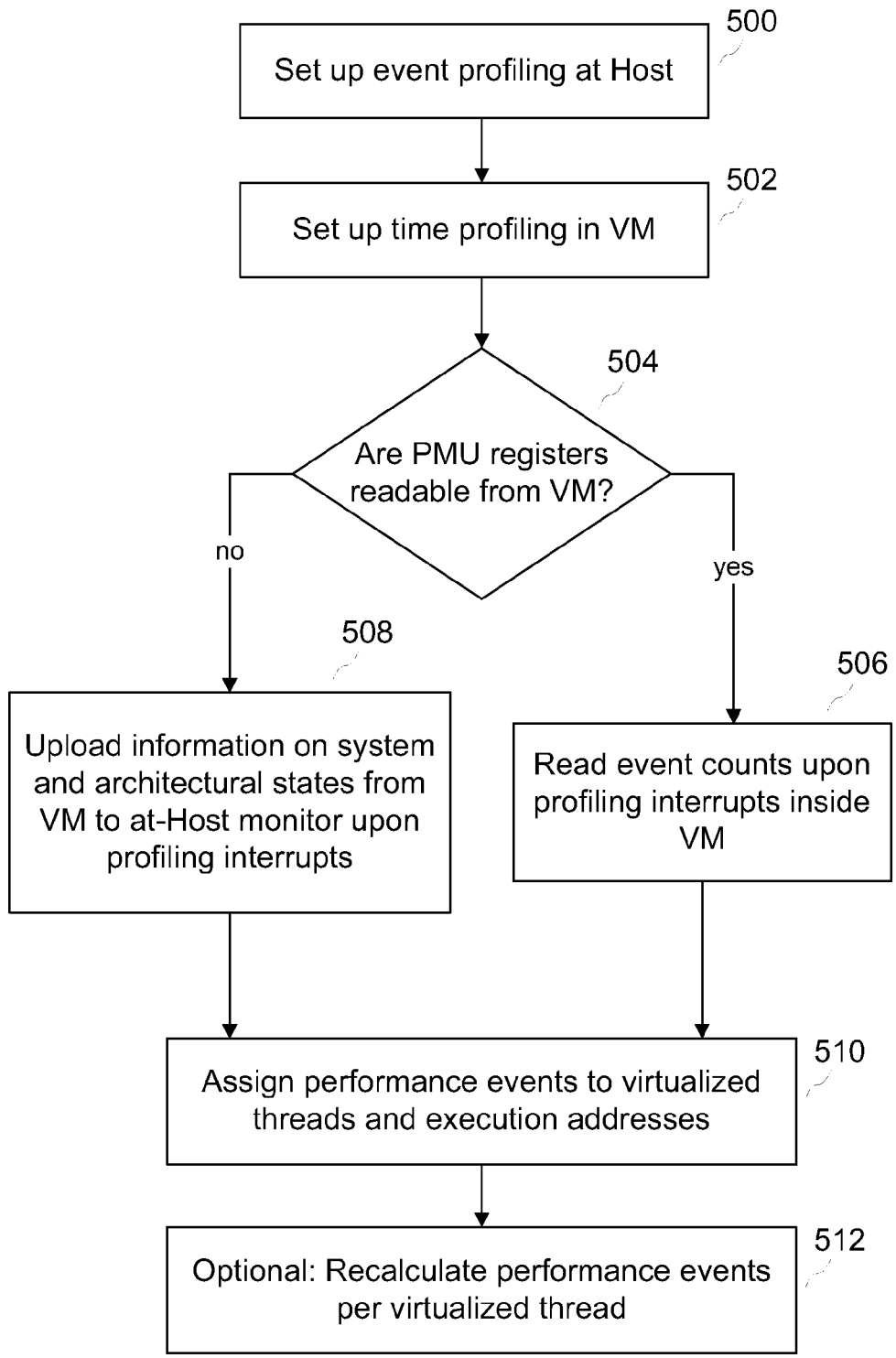
FIG. 5 is a flow diagram illustrating the process of virtual machine-driven performance monitoring according to an embodiment of the present invention.

An alternative approach to virtual machine performance monitoring is explained in the example of FIG. 5.

FIG. 5 is a flow diagram illustrating the process of virtual machine-driven performance monitoring according to an embodiment of the present invention. According to the figure, performance monitoring may be initiated by the primary domain performance monitoring component at block 500, in the form of either event-based sampling or event counting. Per-execution thread event counting may be established to improve the precision of the disclosed method by eliminating the events counted for processes other than the virtual machine manager in whose context the virtual machine operates. Then, time-based profiling may be set up inside the virtual machine at block 502. The time-based profiling may comprise any interruption of the normal execution flow after certain time intervals. Per-execution thread time-based profiling may provide for better precision of the performance monitoring process while not deviating from the scope of the present invention.

Then, the virtual domain performance monitoring component may check for the level of support available from the virtual machine manager at block 504. In case the physical event counting registers of the performance monitoring unit are made accessible for reading, the virtual domain performance monitoring component may read the contents of said registers at block 506 upon reception of each time-based profiling interruption. The retrieved event count may then be associated with the current execution state of the virtual machine at block 510.

In case performance monitoring in the primary domain was set up in a counting mode, the performance events may be gradually accumulated and assigned to each subsequent software state of the virtual domain, said software states having no logical connection with each other as they may pertain to different processes (tasks) whose execution may be interleaved in time in an extemporaneous manner. To correct the event distribution event numbers previously assigned to the execution states may be recalculated on a per-software task basis at block 512.

If hardware performance registers are not accessible from inside the virtual domain, as may be determined at block 504, information on the current execution state of the virtual machine may be reported to the primary domain performance monitoring component (at block 508). The execution state may comprise similar information on system and architectural states as to what was described above in the example of FIG. 2, or may comprise such a reference to said states that will enable establishing correspondence (at block 510) between the state information preserved in the virtual domain and the performance event information stored in the primary domain.

Similarly, the distribution of performance events to software states may be corrected on a per-software task basis at block 512.

For C and Assembly language examples of embodiments of the present invention refer to Appendices A, B, C, and D, wherein Appendix A illustrates the process of handling performance monitoring interrupts whose stack frame contents may be modified by a hypervisor to convey information on architectural and system states of a virtual machine; Appendix B provides an example of establishing correspondence between threads of a virtual machine manager running in the primary domain and virtualized processors; Appendix C furnishes an example of associating virtualized system states with performance events; and Appendix D is an illustration of redistributing performance events between virtualized system activity states of separate virtualized processors.

The provided code excerpts do not constitute a complete performance monitoring system, are provided for illustrative purposes, and should not be viewed as a reference implementation with regard to both their functionality and efficiency.

One skilled in the art will recognize the option of implementing different schemes to communicate information between performance monitors of the primary and virtual domains, combined with the host- or VM-driven performance monitoring approaches, depending on capabilities of a particular virtualization engine—without deviating from the scope of the present invention. One skilled in the art will also recognize that the disclosed invention may be applied to different types of virtualized environments and virtualization systems, pure software or hardware-assisted, that may employ either partial or complete virtualization of computer systems or programming environments.

Furthermore, one skilled in the art will recognize that embodiments of the present invention may be implemented in other ways and using other programming languages.

The techniques described herein are not limited to any particular hardware or software configuration; they may find applicability in any computing or processing environment.

The techniques may be implemented in logic embodied in hardware, software, or firmware components, or a combination of the above. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the scope of the invention.

APPENDIX A

© 2007 Intel Corporation

A C and Assembly code example of a performance monitoring interrupt service routine operating on a simulated stack frame reported by a hypervisor.

The goal of the code is to differentiate between the real hardware stack frame contents and the simulated data reported by the virtual machine manager or hypervisor. The code inspects the stack frame to locate illegal encodings, and then fetches the simulated timestamp, instruction pointer, and processor ID to be stored separately. The control is finally returned to the real hardware instruction pointer.

All provided code excerpts do not constitute a complete performance monitoring system, are provided for illustrational purposes, and should not be viewed as a reference implementation with regard to both its functionality and efficiency. Some of the provided code excerpts, being inessential for the purposes of the present invention, may be optionally included in embodiments of the present invention.

```
/// Primary PMI routine
/// handles PMI, calls the stack interpreter,
/// adjusts the stack frame, and returns control
/// to the originally interrupted code
void __declspec(naked) pmi_handler( )
{
  __asm
  {
    push   eax
    pushad
    lea    eax,[esp + 24h]
    push   eax
    call   stack_check
    pop    ebx
    mov    edx,[ebx]          ;;; copy IP
    mov    [ebx + eax],edx    ;;;
    mov    ecx,[ebx + 04h]    ;;; copy CS
    mov    [ebx + eax + 04h],ecx  ;;;
    mov    esi,[ebx + 08h]    ;;; copy EFLAGS
    mov    [ebx + eax + 08h],esi  ;;;
    mov    edi,[ebx + 0ch]    ;;; copy SP
    mov    [ebx + eax + 0ch],edi  ;;;
    mov    edx,[ebx + 10h]    ;;; copy SS
    mov    [ebx + eax + 10h],edx  ;;;
    add    eax,4
    mov    [esp + 20h],eax
    popad
    add    esp,[esp]          ;;; adjust the stack
    iretd
  }
}
/// Stack frame format
typedef struct
{
  /// architectural part
  void* ip;
  union
  {
    void* cs;
    struct
    {
      short dummy;
      short id;
    };
  }
  void* flags;
  void* sp;
  void* ss;
  /// simulated/virtualized part
  struct sim_state_t
  {
    long long sim_timestamp;
    int sim_cpu;
    int sim_ip;
    int sim_pid;
    int sim_tid;
  } sim_state;
} exec_frame_t;
/// Stack frame interpreter routine
/// returns the simulated stack frame size
int stack_check(exec_frame_t* eframe)
{
  if(eframe->id)
  {
    trace(&eframe->sim_state, sizeof(sim_state_t));
    return sizeof(sim_state_t);
  }
  return 0;
}
```

APPENDIX B

© 2007 Intel Corporation

A C and Assembly code example of mapping the virtualizing primary domain threads of a virtual machine manager to the processors they virtualize.

The goal of the code is to establish a mapping between virtualizing threads of the virtual machine manager and the indices of virtualized processors. The provided code example is applicable to such virtualization systems that maintain time scale identical to that of the primary domain, and allow the physical processor indices to be retrieved from within the virtualized environments.

The code sets up the virtualized system processor affinity mask in order to execute the operating routine consecutively on each of the virtualized system processors. Then, the timestamp and physical processor index are retrieved to be associated with the current virtualized processor index. The retrieved information enables direct mapping of a primary domain thread ID that happened to be active on a physical processor at a given time, to the corresponding virtualized processor index. The resulting map is essential for distributing performance events collected in the primary domain among the registered states of the virtualized system.

```
/// Read processor timestamp counter (shared between VM and Host)
long long __declspec(naked) rdtsc( )
{
  __asm rdtsc
  __asm ret
}
/// Read Host processor identifier
int __declspec(naked) cpuid( )
{
  __asm
  {
    push ecx
    push ebx
    mov  eax,01h
    cpuid
    shr  ebx,24
    mov  eax,ebx
    pop  ebx
    pop  ecx
    ret
  }
}
/// Form the Host-Vm processor map annotated with timestamps
/// This procedure is to be called inside VM under monitoring
void syncCpus(int iteration_count)
{
  SYSTEM_INFO sysinfo;
  GetSystemInfo(&sysinfo);
```

```
  int cpuno = sysinfo.dwNumberOfProcessors;
  std::cout << "Timestamp Host-CPU Guest-CPU" << std::endl;
  for(int i = 0; i < cpuno; i++)
  {
    SetThreadAffinityMask(GetCurrentThread( ), 1 << i);
    Sleep(100);
    for(int j = 0; j < iteration_count; j++)
    {
      int host_cpu = cpuid( );
      long long tsc = rdtsc( );
      std::cout << std::hex << tsc << " " <<
      std::hex << host_cpu << " "
        << std::hex << i << std::endl;
    }
  }
}
```

APPENDIX C

© 2007 Intel Corporation

A C code example of associating virtualized execution states with performance events in case said execution states are not reported by a hypervisor.

The goal of the code is to assign performance event information accrued for a virtual machine manager in the primary domain to the execution states of a virtual machine. To accomplish that, for each virtualized execution state record a timestamp and a processor index are fetched from a virtual machine trace file, then, the primary domain trace file is indexed with said timestamp, and a set of thread activity records corresponding to the timestamp are selected. After that, the primary domain thread virtualizing the processor of the fetched index is chosen from the virtualizing threads-to-virtualized processors map. The event records for the chosen thread are assigned to the current virtualized system thread.

```
/// Examplary system state structure
typedef struct
{
  long long event_count;
  int pid;
  int tid;
  int ip;
  int cpu;
  long long timestamp;
} system_state_t;
/// In-VM trace
class virtual_trace;
/// Formed primary TID-to-virtualized CPU map
std::map<int, int> cpu2tid;
/// Pre-parsed primary domain trace
std::multimap<long long, system_state_t> preparsed_primary_trace;
/// Fetches a set of thread activity records by a timestamp,
/// forms a map of states by thread ID
void get_tids(std::map<int, system_state_t*> &tid_set, long long time)
{
  std::pair<std::multimap<long long, system_state_t*>::iterator,
        std::multimap<long long, system_state_t*>::iterator> range;
  /// get bounds for a set of system state records
  range = preparsed_primary_trace.equal_range(time);
  while(range.first != range.second)
  {
    /// form a may of system state records indexed by cpu
    tid_set[range.first->second->tid] = range.first++->second;
  }
}
/// Assigns events to each system state of a virtual machine
void distribute_events(virtual_trace* trace)
{
  /// a map of system states in primary domain
```

```
  std::map<int, system_state_t> tid_set;
  system_state_t* system_state;
  while(trace->get_next_state(&system_state))
  {
    /// find primary threads by a timestamp
    get_tids(tid_set, system_state->timestamp);
    /// assign the event count of a primary thread virtualizing
    /// the current VM processor to the current VM state
    system_state->event_count =
        tid_set.find(cpu2tid.find(system_state->cpu)
          ->second)->second->event_count;
  }
}
```

APPENDIX D

© 2007 Intel Corporation

A C code example of redistributing performance events between virtualized system activity states of separate virtualized processors.

The goal of the code is to recalculate integral values of performance events associated with virtualized system states into differential values in order to raise the precision of performance event association. For that purpose, the code assigns each activity state with the number of events equal to the difference between the currently assigned number and the number of events assigned to an immediately preceding system state from the same virtualized processor. The resulting differential event numbers may then be optionally recalculated into the integral form for each virtualized thread or process.

```
/// Examplary system state structure
typedef struct
{
  long long event_count;
  int pid;
  int tid;
  int ip;
  int cpu;
  long long timestamp;
} system_state_t;
class virtual_trace;
/// Recalculates events differentially for all tasks executed on a processor,
/// then integrates the event numbers on a per-task basis
void redistribute_events(virtual_trace* trace)
{
  /// a map of thread IDs
  std::map<int, long long> tid_map;
  std::map<int, long long>::iterator tid_itr;
  /// a map of processors
  std::map<int, long long> cpu_map;
  std::map<int, long long>::iterator cpu_itr;
  system_state_t* system_state;
  while(trace->get_next_state(&system_state))
  {
    if((cpu_itr = cpu_map.find(system_state->cpu)) ==
    cpu_map.end( ))
    {
      cpu_map[system_state->cpu] = system_state->event_count;
    }
    else
    {
      /// capture the current difference per processor
      cpu_itr->second = system_state->event_count –
      cpu_itr->second;
    }
    if((tid_itr = tid_map.find(system_state->tid)) == tid_map.end( ))
    {
      tid_map[system_state->tid] = 0;
      tid_itr = tid_map.find(system_state->tid);
    }
```

```
    else
    {
        /// update per-thread event numbers
        tid_itr->second += cpu_map[system_state->cpu];
    }
    /// assign recalculated events (zero-based integral form) back to
    system states
        system_state->event_count = tid_itr->second;
    }
}
```

What is claimed is:

1. In a processing system that enables the use of physical performance monitoring capabilities to measure program performance in virtualized execution environments, a computer implemented method comprising:
   collecting performance events for a processor using a performance monitoring unit in the processor;
   counting the performance events collected by the performance monitoring unit;
   causing the performance monitoring unit to generate a performance monitoring interruption to interrupt the normal execution flow of the processor based on a count of the performance events exceeding a certain number;
   determining, using a hypervisor executed by the processor, that the interruption occurred during a period of activity of at least one virtual machine;
   reporting architectural states of the at least one virtual machine to a primary domain performance monitoring component synchronously with the performance monitoring interruption based on the determination of the hypervisor, wherein architectural states comprise information to identify at least one virtualized processor in the at least one virtual machine and an instruction address being executed;
   reporting system states of the at least one virtual machine to the primary domain performance monitoring component synchronously with the performance monitoring interruption based on the determination of the hypervisor;
   monitoring system activity within the virtual domain in response to the system states not being reported;
   measuring program performance in the at least one virtual machine by associating processor performance characteristics with the system and architectural states of the at least one virtual machine; and
   raising the precision of the performance characteristics-state association by redistributing, by the processor, performance events between virtualized system activity states of separate virtualized processors within separate virtual machines;
   wherein said performance monitoring interruption is generated due to a change in the performance monitoring process.

2. The computer-implemented method of claim 1, wherein architectural states further comprise a time reference if the system states are not reported.

3. The computer-implemented method of claim 1, wherein system states comprise information to identify at least a software task being executed.

4. The computer-implemented of claim 1, wherein monitoring system activity comprises establishing correspondence between system states and architectural states over time.

5. One or more non-transitory computer-readable memories which store, in combination or singularly, a plurality of computer readable instructions, wherein when the instructions are executed by one or more processors of one or more computers, the instructions provide for monitoring operational characteristics of virtualized execution environments associated with said one or more computers by:
   collecting performance events for a processor using a performance monitoring unit in the processor;
   counting the performance events collected by the performance monitoring unit;
   causing the performance monitoring unit to generate a performance monitoring interruption to interrupt the normal execution flow of said processor based on a count of the performance events exceeding a certain number;
   determining, using a hypervisor executed by the processor, that the interruption occurred during a period of activity of at least one virtual machine;
   reporting architectural states of the at least one virtual machine to a primary domain performance monitoring component synchronously with the performance monitoring interruption based on the determination of the hypervisor, wherein architectural states comprise information to identify at least one virtualized processor in the at least one virtual machine and an instruction address being executed;
   reporting system states of the at least one virtual machine to the primary domain performance monitoring component synchronously with the performance monitoring interruption based on the determination of the hypervisor;
   monitoring system activity within the virtual domain in response to the system states not being reported;
   measuring program performance in the at least one virtual machine by associating processor performance characteristics with the system and architectural states of the at least one virtual machine; and
   raising the precision of the performance characteristics-state association by redistributing, by the processor, performance events between virtualized system activity states of separate virtualized processors within separate virtual machines;
   wherein said performance monitoring interruption is generated due to a change in the performance monitoring process.

6. The one or more non-transitory computer-readable memories of claim 5, wherein architectural states further comprise a time reference if the system states are not reported.

7. The one or more non-transitory computer-readable memories of claim 5, wherein system states comprise information to identify at least a software task being executed.

8. The one or more non-transitory computer-readable memories of claim 5, wherein monitoring system activity comprises establishing correspondence between system states and architectural states over time.

* * * * *